J. F. O'CONNOR.
FRICTION SHOCK ABSORBING MECHANISM.
APPLICATION FILED MAY 6, 1920.
1,363,007.
Patented Dec. 21, 1920.
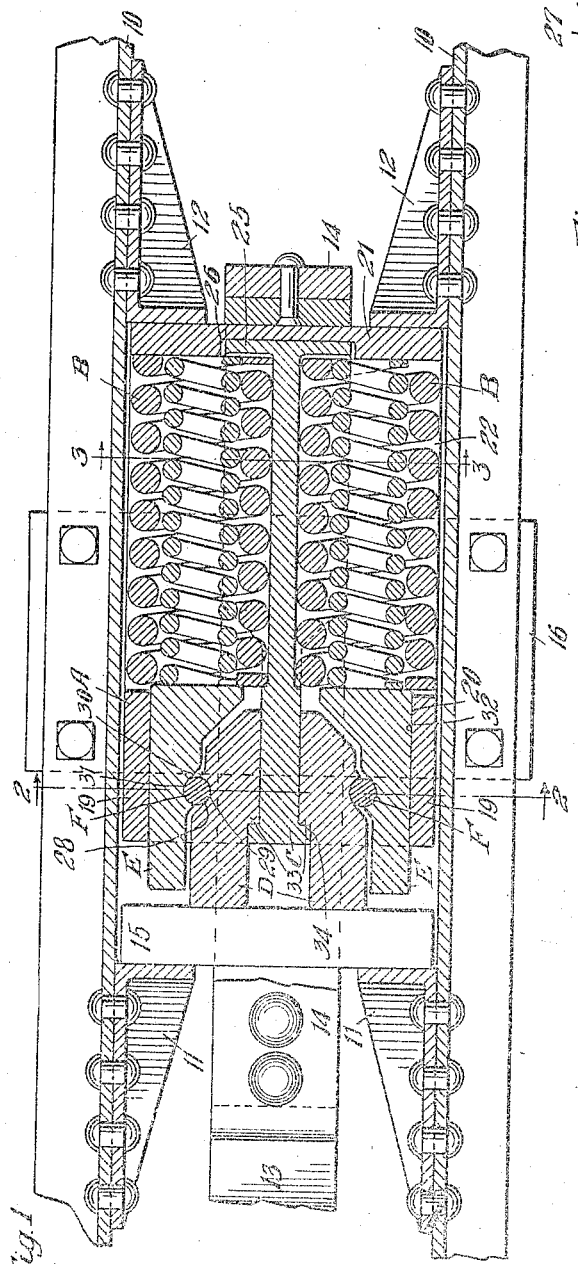
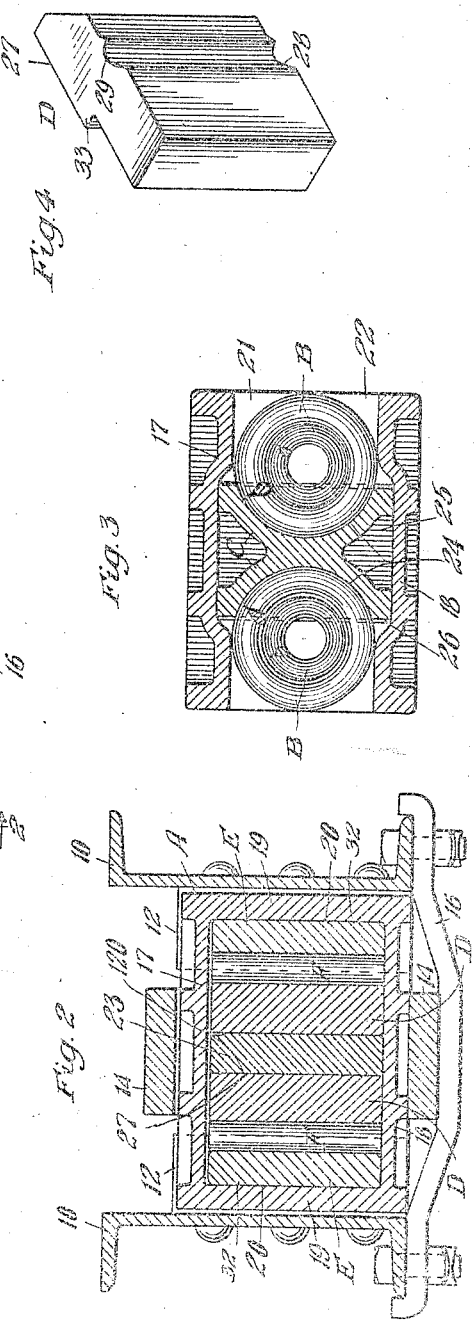
Witnesses
Wm. Geiger
Una C. Perer
Inventor
John F. O'Connor
By Geo. I. Haight
His Atty.

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,363,007.   Specification of Letters Patent.   Patented Dec. 21, 1920.

Application filed May 6, 1920. Serial No. 379,324.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings wherein are employed a plurality of sets of independent friction devices to obtain high frictional capacity and means associated with said sets of friction devices to insure certain release.

A more specific object of the invention is to provide a friction shock absorbing mechanism having a twin arrangement of friction devices so arranged that the friction devices operate independently and therefore additively during the compression stroke but, in release, with the wedges of the two sets of devices co-acting with a common interposed member as a single wedge, for a limited distance, to effect certain release.

Another specific object of the invention is to provide a friction shock absorbing mechanism wherein are employed a friction shell divided into independent friction chambers, a corresponding plurality of sets of friction devices, one set in each chamber, and a partially floating element coöperating with the friction devices to automatically compensate for inequalities of original manufacture and for wear during service.

The invention furthermore consists in the improvements in the parts and devices and in the novel combinations of the parts and devices herein shown, described and made the subject matter of claim.

In the drawing forming a part of this specification, Figure 1 is a horizontal longitudinal sectional view of a portion of a railway draft rigging showing my improvements in connection therewith. Fig. 2 is a vertical transverse sectional view taken substantially on the line 2—2 of Fig. 1. Fig. 3 is a transverse sectional view of the shock absorbing mechanism proper and corresponding substantially to the line 3—3 of Fig. 1. And Fig. 4 is a detail perspective of one of the friction-wedges employed with my improvements.

In said drawing, 10—10 denote channel shaped center or draft sills of a railway car to the inner faces of which are secured front stop lugs 11, and rear stop lugs 12. A portion of a drawbar is indicated at 13 to which is secured a yoke 14 of well known form. In addition to the shock absorbing mechanism proper, hereinafter described, a front follower 15 is disposed within the yoke and all parts are arranged to be supported by a detachable saddle plate 16.

The shock absorbing mechanism proper, as shown, comprises, broadly, a casting A; twin arranged springs B—B; a central loose partition or friction plate or post C; and duplicate sets of friction devices, each set including a friction-wedge D, a friction shoe E, and an anti-friction roller F.

The casting A is of substantially rectangular box-like form and is provided at the front thereof with upper wall 17, lower wall 18, and side walls 19—19, the inner faces or surfaces of the latter providing two longitudinally extending friction surfaces 20—20 on opposite sides of the casting. The upper and lower walls 17—18 are continued for the full length of the casting and are united at their rear ends by a back wall 21, the casting being open for the greater part of its length on each side as indicated at 22—22.

The central partition or friction post C is loosely mounted within the casting A and in such a manner that it has a limited longitudinal movement with respect to the casting A and also lateral movement with respect thereto. At its forward end, the partition C is of substantially vertically elongated rectangular cross section as indicated at 23 in Fig. 2 so that the forward end of the casting A is thereby divided into twin arranged friction chambers, said partition C providing friction surfaces 120—120 on the opposite sides thereof and obviously opposed to the friction surfaces 20—20. Rearwardly of the rectangular section 23, the partition or post C changes its shape so as to provide a column having arcuate recesses 24—24 on the opposite sides thereof (see Fig. 3) to form seats for the springs B—B. At its rear end, the partition C is formed with a flange or foot 25 loosely seated in a recess 26 formed on the inner side of the back wall 21 of the casting A. The recess 26 is larger, laterally or transversely of the casting A, than the flange 25 so that the member C may automatically adjust itself laterally, as will be understood. Furthermore, the thickness of the flange 25, at least where it comes opposite the rear ends of the springs B, is made less than the depth of the recess 26 so that said flange 25 and consequently the partition of which it forms a part, is permitted a longitudinal movement relatively to the casting A between the overhanging portions of the springs B and the bottom of said recess 26. The amount of this limited longitudinal movement can be varied as desired but in actual practice will preferably be made about one-eighth of an inch as this will be sufficient for the purposes hereinafter described.

The sets of friction devices in the twin friction chambers are symmetrically arranged, as clearly indicated in Fig. 1 and a description of one will suffice. Each friction-wedge D is extended outwardly beyond the casting so as to directly engage the front follower 15. Said friction-wedge D is provided on its inner side with a longitudinally extending friction surface 27 which engages with a corresponding friction surface 120 of the partition C. On its outer side, each friction-wedge D is provided with a wedge face 28 and a roll seat 29, the latter being oppositely disposed with respect to corresponding wedge face 30 and roll seat 31 on the friction shoe E. The latter is normally out of engagement with the front follower 15 and has an outer friction surface 32 cooperable with the corresponding friction surface 20 of the casting A. The rear end of each friction shoe E is enlarged so as to obtain the necessary bearing on the front end of the corresponding spring B.

To limit the outward movement of the friction elements with respect to the casting A and thereby maintain the parts in assembled relation, the friction-wedges D may be shouldered as indicated at 33 to engage with corresponding shoulders 34 on the partition C.

The operation is as follows: Assuming an inward movement of the drawbar, the friction-wedges D—D will be forced rearwardly and will slide frictionally with respect to the partition C, the latter being held against the rear wall of the casting A. Friction is thus generated between the members D and C. Simultaneously, there will be an outward spreading of the friction shoes E against the casting A, the spreading pressure being transmitted through the antifriction rollers F. The shoes E will be independently resisted by the springs B. In the compressive stroke, therefore, it is evident that the two sets of friction devices operate independently and high capacity is thereby obtained. During the compressive stroke there will be a relatively slight longitudinal movement of the friction-wedges D with respect to their respective friction shoes E, this movement, in actual practice, approximating one-sixteenth of an inch and will occur because of the slight rolling action of the rollers F on the wedges and shoes as in the well known type of "Miner friction gear." Upon removal of the actuating pressure, the two friction wedges D and the central partition C will act, in release, as a single unit or wedge of the "Miner friction gear" type for a distance corresponding to the space between the flange 25 and the overhanging portions of the springs B. This action of the wedges D and partition C in combination with the anti-friction roller arrangement, is sufficient to relieve the outward or radial pressure of the shoes against the walls of the casting A and permit the springs to project the sets of friction elements outwardly without danger of sticking, the partition C being held, of course, against more than the predetermined limited movement by the springs B which will re-act thereagainst after the initial release action.

By having the central partition C freely adjustable laterally it is evident that any inequalities in the manufacture of the friction elements affecting the spacing between the partition and the side walls of the casting A, will automatically be compensated for and furthermore, if wear on the friction surfaces in one chamber is greater than in the other, the partition will automatically compensate therefor.

Although I have herein shown and described what I now consider the preferred manner of carrying out the invention, the same is merely illustrative and I contemplate all changes and modifications that come within the scope of the claims appended hereto.

I claim:

1. In a friction shock absorbing mechanism, the combination with a hollow casting provided with interior friction surfaces; of a partition within said casting dividing the latter into a plurality of chambers, said partition having friction surfaces opposed to those of the casting, said partition being freely movable lengthwise of the casting for a limited distance; independent sets of cooperating wedge-friction elements in each chamber, one element of each set frictionally engaging said partition; and spring means for yieldingly resisting movement of the friction elements with respect to the shell and partition.

2. In a friction shock absorbing mechanism, the combination with a casting having interior friction surfaces; of a partition within said casting dividing the latter into a pair of twin arranged chambers, said partition having friction surfaces and being freely adjustable laterally of the casting; duplicate sets of wedge-friction elements, one set in each chamber, the laterally adjustable partition in combination with the friction elements providing automatic compensation for inequalities or wear of the parts; and spring means for yieldingly resisting relative movement between the friction elements and the casting and partition.

3. In a friction shock absorbing mechanism, the combination with a hollow casting having interior longitudinally extending friction surfaces; of a friction-post-partition disposed within said casting, said partition being freely adjustable laterally and longitudinally of the casting within predetermined limits and forming with the casting twin arranged friction chambers; friction elements in each of said friction chambers; and spring means for yieldingly resisting relative movement between the friction elements and the casting and partition.

4. In a friction shock absorbing mechanism, the combination with a friction shell; of a floating longitudinally movable partition within said shell and provided with friction surfaces opposed to those of the shell, said partition dividing the shell into twin friction chambers; of a set of friction elements in each chamber, each set including a pressure-transmitting wedge frictionally engaging the partition, a friction shoe, and an anti-friction roller between the wedge and shoe; and a spring associated with each set of friction elements, said wedges and the partition co-acting as a unit, during release for a distance corresponding to the limited longitudinal movement of the partition with respect to the shell.

5. In a friction shock absorbing mechanism, the combination with a friction shell; of a floating longitudinally movable partition within said shell and provided with friction surfaces opposed to those of the shell, said partition dividing the shell into twin friction chambers; of a set of friction elements in each chamber, each set including a pressure-transmitting wedge frictionally engaging the partition, a friction shoe and an anti-friction roller between the wedge and shoe; and a spring associated with each set of friction elements, said wedges and the partition co-acting as a unit, during release for a distance corresponding to the limited longitudinal movement of the partition with respect to the shell, said partition being also freely laterally adjustable within the shell.

6. In a friction shock absorbing mechanism, the combination with a casting provided at one end thereof with a friction shell and adapted also to receive springs therein; of a partition disposed within said casting and longitudinally movable with respect thereto for a predetermined limited distance, said partition being provided with friction surfaces opposed to the friction surfaces of the shell and dividing the latter into twin friction chambers; a set of friction elements in each of said chambers, each set including elements having opposed wedge surfaces, an anti-friction roller therebetween, and shoulders on the elements engaging said roller to thereby prevent longitudinal separation of the friction elements while in the chamber; springs within the casting and coöperable with the friction elements; and means for limiting the outward movement of one friction element of each set with respect to the shell.

7. In a friction shock absorbing mechanism, the combination with a casting of substantially hollow box-like form at one end thereof and provided with opposed friction surfaces therein, said casting having a transversely extending end wall at its opposite end; of a partition loosely mounted within said casting and adapted for movement both laterally and longitudinally with respect to the casting, said partition being provided with friction surfaces opposing those of the casting; duplicate sets of friction devices coöperating with the partition and casting and located on opposite sides of the partition; and coöperating shoulders on the partition and one element of each friction device to limit the outward movement of the friction device with respect to the casting, said partition being provided at its rear end with laterally extended flanges; and springs mounted within the casting, one on each side of the partition, each spring engaging at its forward end, a friction element and, at its rear end, overlapping said flange to limit the outward movement of the partition with respect to the casting.

In witness that I claim the foregoing I have hereunto subscribed my name this 24th day of April, 1920.

JOHN F. O'CONNOR.

Witness:
CARRIE GAILING.